July 26, 1955 V. SOBOL 2,713,752
PLANT POT
Filed April 2, 1954
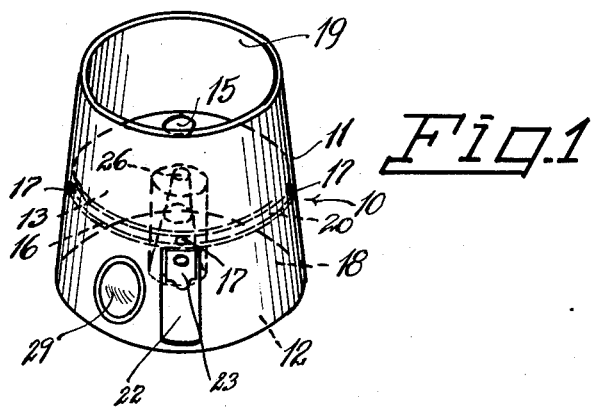
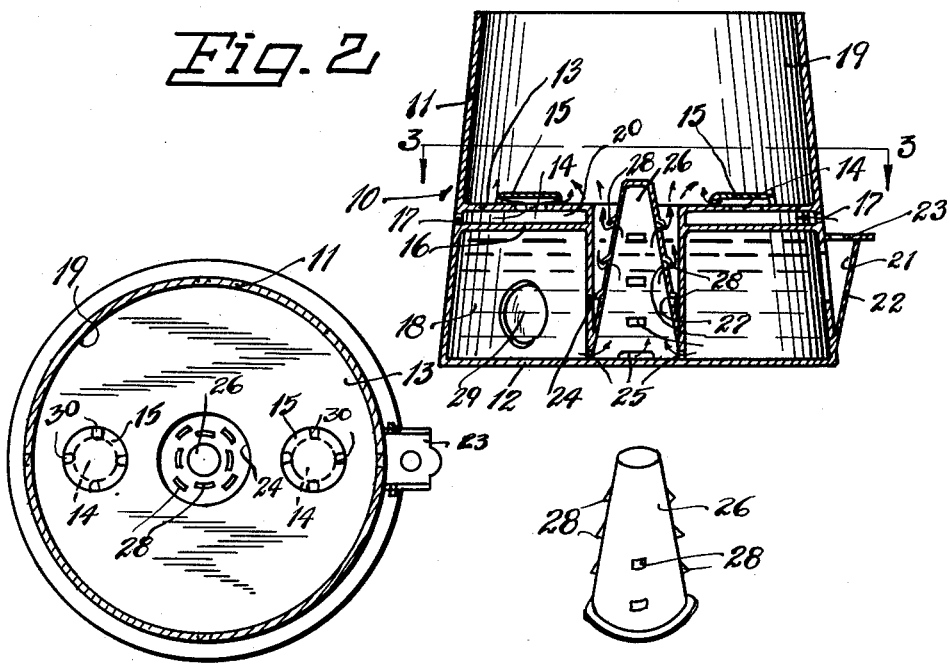
INVENTOR.
Victor Sobol
BY
Fish and Huff United States Patent Office 2,713,752
Patented July 26, 1955

2,713,752
PLANT POT

Victor Sobol, Spokane, Wash., assignor of one-half to Nicholas Mandic, Spokane, Wash.

Application April 2, 1954, Serial No. 420,505

3 Claims. (Cl. 47—38)

This invention is an improved plant pot.

One object of the invention lies in the provision of a plant pot having a separate soil chamber and fluid reservoir interconnected by structure comprising a perforated cone providing an enlarged transfer area through which fluid is drawn by capillary action into the soil.

Another object of the invention lies in the provision of a plant pot having an upper soil chamber and a lower fluid reservoir separated by a relatively thin air space adapted to aerate the soil and thus prevent souring thereof and including a means of communicating the fluid by capillary action with the soil.

Another object of the invention lies in the provision of a plant pot having a separately defined soil chamber and a fluid reservoir whereby substantially no fluid is lost by evaporation and therefore one which requires very little servicing attention.

Another object of the invention lies in the provision of a plant pot which continuously supplies water to the plant thus providing rapid growth of luxuriant foliage and which has means associated therewith for precluding souring of the soil.

These and other objects of the invention will become apparent during the course of the following description wherein a preferred form of the invention is disclosed, reference being made to the accompanying drawings wherein like numerals are employed to designate like parts.

In the drawings,

Figure 1 is a perspective view of a plant pot embodying the present invention;

Figure 2 is a vertical transverse cross section taken through the pot;

Figure 3 is a horizontal cross section at line 3—3 of Figure 2; and,

Figure 4 is a perspective view of the frusto-conical filter.

In the drawings the numeral 10 is employed to designate the improved plant pot as a whole which is shown to be frusto-conical in shape, having upwardly tapered side walls 11 and a flat bottom 12. Intermediate its height the pot 10 is provided with a horizontal bottom wall 13 for the said chamber 19. The wall may be defined as being formed of porous material through which air or liquid may pass to a limited degree and in Figure 2 this is shown to take the form of small apertures 14 formed therein and provided each with a cover plate 15 which is adapted to prevent soil from passing outwardly through the apertures 14.

Spaced below the wall 13 is a second wall 16 forming a relatively thin air space which communicates through apertures 17 with the atmosphere. Wall 16 is impervious and forms an air tight top to the fluid reservoir 18. It will thus be seen that the reservoir 18 is disposed below the soil chamber 19 and the two are separated by a relatively thin air space 20. The top wall of the air space 20 is the wall 13 and the bottom wall of the air space 20 is the wall 16.

The fluid container 18 is provided with a filler opening 21 spaced below the wall 16 and having a spout-like projection 22 extending substantially up to the wall 16 and is provided with a cover 23 to prevent evaporation of the water from the reservoir.

A central well 24 communicates with the soil container 19 and extends downwardly through the air space 20 to the bottom 12 of the reservoir 18. The well 24 is formed of impervious material and is provided with apertures 25 at its juncture with the bottom 12. Therefore, the fluid in the reservoir 18 may pass through the apertures 25 into the well 24. Within the well 24 I provide a frustoconical filter 2* which is adapted to permit the fluid to pass from the reservoir 18 to the soil in the well 24. It will be noted that the frusto-conical filter 26 is provided with a plurality of apertures 27 which are formed by pressing minute portions of the filter 26 outwardly to form louvers 28, thus the water may pass from the reservoir through the filter 26 to the soil and yet the soil cannot enter the reservoir 18.

As here shown, the plant pot is formed of metal and the reservoir is provided with a transparent window 29 through which the level of the water in the reservoir 18 may be viewed. It will be understood however that the plant pot may be formed of any type material found suitable and the reservoir walls may be transparent or semi-transparent so that the level of the water therein may be determined visually.

The frusto-conical filter 26 is shown to be formed of pressed metal, however, other material may be formed with the apertures 27 or may have the desired porosity to permit permeation of the fluid from the reservoir into the soil.

The cover plates 15 are circular discs having downwardly pressed indentations at 29 thus supporting the body of the disc spaced above the wall 13 sufficiently to permit ingress of air from the air space 20 into the soil disposed in the soil container 19.

By actual tests I have found that a plant pot having a base approximately 8 inches in diameter and a full height of approximately 9 inches, approximately 3 inches of which is consumed by the reservoir height while ¼ inch is consumed in the air space, will provide ample irrigation, under normal conditions, for a plant during a period of from three to four months without any attention. In tests, the apertures 17 were plugged and it was found that the soil soured and caused the plant to be sickly. When the vent openings 17 and 14 are left open the soil stays fresh and sweet and the plant flourishes providing luxuriant foliage and grows rapidly beyond that of a plant cared for daily and in a conventional clay flower pot.

Having thus described my invention, I claim:

1. A plant pot comprising a container having an upper soil chamber separated from a concentric lower fluid reservoir by a relatively thin air space open to the atmosphere and defined by a transverse porous upper wall forming the bottom of said soil chamber and a transverse impervious lower wall forming the top of said reservoir; a central impervious well communicating with the bottom of said chamber and extending downwardly therefrom through said air space and through said lower wall to the bottom of said reservoir and communicating therewith at its juncture, and a porous frusto-conical filter in the well for separating the soil introduced therein through the soil chamber and the fluid of said reservoir and providing an enlarged fluid transfer area intermediate the fluid and soil.

2. A plant pot comprising a container having an upper soil chamber separated from a lower fluid reservoir by a transverse bottom wall; the bottom wall of said chamber having apertures therethrough; cover plates consisting of circular discs having downwardly pressed indentations supporting the bodies of the discs in covering relation to said apertures for effecting ingress of air from below said wall; a transverse impervious lower wall forming a top wall for said fluid reservoir secured below the first named wall and together therewith defining a relatively thin air space; means communicating said air space with the atmosphere for ingress of air; and a central impervious well adapted to be filled with soil and communicating with said bottom wall of said soil chamber and extending downwardly therefrom through said air space and through said lower wall to the bottom of said reservoir and communicating therewith at its juncture, whereby fluid from said reservoir by capillary action permeates said soil.

3. A plant pot comprising a container having an upper soil chamber separated from a lower fluid reservoir by a relatively thin air space open to the atmosphere and defined by a transverse porous upper wall forming the bottom of said soil chamber and a transverse impervious lower wall forming the top of said reservoir; a central impervious well adapted to be filled with soil and communicating with the bottom of said soil chamber and extending downwardly therefrom through said air space and through said lower wall to the bottom of said reservoir and communicating therewith at its juncture, whereby fluid from said reservoir by capillary action permeates said soil; said fluid reservoir having a filler opening spaced below its top; and an upwardly projecting filler spout communicating with said filler opening and extending substantially up to the top of said reservoir.

References Cited in the file of this patent

UNITED STATES PATENTS

| | | |
|---|---|---|
| 235,516 | Conway | Dec. 14, 1880 |
| 2,030,268 | Radley | Feb. 11, 1936 |
| 2,278,991 | Hasslacher et al. | Apr. 7, 1942 |
| 2,344,202 | Carlson | Mar. 14, 1944 |
| 2,638,716 | Luipersbek | May 19, 1953 |

FOREIGN PATENTS

| | | |
|---|---|---|
| 5,732 | Australia | Apr. 24, 1928 |
| 54,894 | Germany | Jan. 12, 1891 |